(12) United States Patent
Lane et al.

(10) Patent No.: US 9,476,772 B2
(45) Date of Patent: Oct. 25, 2016

(54) TEMPERATURE SENSOR AND AN INFRARED DETECTOR INCLUDING SUCH A SENSOR

(75) Inventors: William Allan Lane, Cork (IE); Paul Martin Lambkin, Cork (IE)

(73) Assignee: Analog Devices, Inc., Norwood, MA (US)

( * ) Notice: Subject to any disclaimer, the term of this patent is extended or adjusted under 35 U.S.C. 154(b) by 1246 days.

(21) Appl. No.: 13/434,075

(22) Filed: Mar. 29, 2012

(65) Prior Publication Data

US 2013/0259086 A1    Oct. 3, 2013

(51) Int. Cl.
| | |
|---|---|
| G01J 1/16 | (2006.01) |
| G01J 5/04 | (2006.01) |
| G01J 5/20 | (2006.01) |
| G01J 5/24 | (2006.01) |

(52) U.S. Cl.
CPC .................. *G01J 5/046* (2013.01); *G01J 5/20* (2013.01); *G01J 5/24* (2013.01)

(58) Field of Classification Search
CPC ............... G01J 5/046; G01J 5/24; G01J 5/20
USPC ....... 374/120, 121, 185, 170, 178, 114, 110, 374/166, 133, 141; 702/130; 327/512, 513
See application file for complete search history.

(56) References Cited

U.S. PATENT DOCUMENTS

| | | | |
|---|---|---|---|
| 5,795,069 A * | 8/1998 | Mattes ..................... | G01K 7/21 327/513 |
| 6,155,711 A | 12/2000 | Schaupert et al. | |
| 7,417,230 B2 * | 8/2008 | Anderson et al. ......... | 250/338.1 |
| 7,435,964 B2 | 10/2008 | Lane et al. | |
| 2002/0166968 A1 * | 11/2002 | Bradley ..................... | 250/338.1 |
| 2007/0138394 A1 * | 6/2007 | Lane ......................... | G01J 1/04 250/353 |

(Continued)

FOREIGN PATENT DOCUMENTS

| | | |
|---|---|---|
| JP | 08-062055 | 3/1996 |
| JP | 2008-060155 | 3/2008 |
| JP | 2008-118502 | 5/2008 |

OTHER PUBLICATIONS

Gaalema et al., Final Report for topic A10a-T004 STTR entitled "MEMS based thermopile infrared detector array for chemical and biological sensing," conducted by Black Forest Engineering for U.S. Army Research Office, dated Apr. 20, 2011, 27 pages.

(Continued)

*Primary Examiner* — Lisa Caputo
*Assistant Examiner* — Janice M Soto
(74) *Attorney, Agent, or Firm* — Knobbe, Martens, Olson & Bear, LLP

(57) ABSTRACT

A temperature sensor for use in an infrared detector the temperature sensor comprising: a first resistor associated with a first thermal path having a first thermal conductivity between the first resistor and a substrate and a first temperature coefficient of resistance; a second resistor associated with a second thermal path having a second thermal conductivity between the second resistor and the substrate and a second temperature coefficient of resistance, and a measurement circuit responsive to changes in the resistance of the first and second resistors to estimate changes in temperature, and wherein at least one of (a) the first and second thermal conductivities are different or (b) the first and second temperature coefficients of resistance are different.

20 Claims, 8 Drawing Sheets

(56) References Cited

U.S. PATENT DOCUMENTS

2010/0030506 A1 2/2010 Cairnduff
2010/0198546 A1* 8/2010 Kamata .................... 702/99

OTHER PUBLICATIONS

Hayat Majeed M., et al., Statistical Algorithm for Nonuniformity Correction in Focal-Plane Arrays. Applied Optics, vol. 38, No. 8, Mar. 10, 1999, p. 772-780.
Hsu et al., "A new approach of thermal type microsensor with photonic crystal," Instrumentation on Measurement Technology Conference (I2MTC), IEEE, 4 pages, Department of Mechatronics Engineering, National Changhua University of Education.
Electrophysics Resource Center: Scientific Imaging. White Paper: Understanding Infrared Camera Thermal Image Quality. Edition: 11-09 rev03, 2009, 12 pages. Available at: www.electrophysics.com/e/dl-files/whitepapers_ph/WP-Ph-TIQ.pdf (Accessed, Dec. 7, 2012).
U.S. Appl. No. 13/426,165, filed Mar. 21, 2012, 28 pages.
U.S. Appl. No. 13/692,748, filed Dec. 3, 2012, 23 pages.
PCT Search Report and Written Opinion of Aug. 26, 2013 for International Application No. PCT/US2013/033667, filed on Mar. 25, 2013. 10 Pages.

* cited by examiner

TEMPERATURE SENSOR AND AN INFRARED DETECTOR INCLUDING SUCH A SENSOR

FIELD

The present invention relates to a temperature sensor, and to infrared detectors or infrared sensors including such a temperature sensor.

BACKGROUND

It is known that to facilitate infrared imaging, for example to estimate the temperature of an object being imaged or the change in temperature over time of an object being imaged, it is desirable to know a temperature of the infrared detector(s), also known as infrared sensors, so as to be able to apply compensation for temperature related artifacts of the infrared sensors.

SUMMARY

According to a first aspect of the present invention there is provided a temperature sensor for use in an infrared detector, the temperature sensor comprising:
  a first resistor having a first thermal path having a first thermal conductivity between the first resistor and a substrate and a first temperature coefficient of resistance;
  a second resistor having a second thermal path having a second thermal conductivity between the second resistor and the substrate and a second temperature coefficient of resistance, and a measurement circuit responsive to changes in the resistance of the first and second resistors to estimate changes in temperature, and wherein at least one of a) the first and second thermal conductivities are different or b) the first and second temperature coefficients of resistance are different.

It is thus possible, by deliberately using materials having different temperature coefficients of resistance or by deliberately introducing mismatched thermal conductivity between a resistor and its surroundings, for example a substrate or a die of an integrated circuit to provide a measurement circuit which is sensitive to, for example, the die temperature of an integrated circuit carrying an array of infrared detectors—which term is used synonymously with infrared sensors.

In an embodiment of the invention there is provided an infrared detector or infrared imaging device comprising at least one temperature detector comprising:
  a first resistor having a first temperature coefficient of resistance and associated with a first thermal path having a first thermal conductivity between the first resistor and a substrate;
  a second resistor having a second temperature coefficient of resistance and associated with a second thermal path having a second thermal conductivity between the second resistor and the substrate; and a measurement circuit responsive to changes in the resistance of the first and second resistors to estimate changes in temperature, and wherein at least one of the first and second thermal conductivities and the first and second temperature coefficients of resistance are deliberately different.

According to a second aspect of the present invention there is provided a method of measuring a temperature of a substrate, comprising forming first and second resistors having different thermal conductivities between the resistors and the substrate, passing a current through the resistors such that they are heated by the current, and using a difference in the resistances of the resistors to estimate the temperature of the substrate.

According to a third aspect of the present invention there is provided a method of measuring a temperature of a substrate, comprising forming first and second resistors having different temperature coefficients of resistivity and in thermal contact with the substrate via paths which may have the same or different thermal conductivities, and where a current is passed through the resistors such that the resistances can be measured, and the relationship between the resistances of the resistors is used to estimate the temperature of the substrate.

BRIEF DESCRIPTION OF THE DRAWINGS

Embodiments of the invention will now be described, by way of non-limiting example, with reference to the accompanying figures, in which.

DESCRIPTION OF EXAMPLE EMBODIMENTS

Embodiments of the invention will be described, as non-limiting examples, with reference to the accompanying Figures. Terms such as "above", "below", and the like are used in the context of describing items as oriented in the Figures so as to aid in the description of the relation of parts to one another in the example embodiments described and are not to be construed as limitations.

It is known that it is possible to detect infrared radiation, and indeed to thermally image a scene, as a result of the heat that the infrared radiation delivers to a suitably configured detector. Such a detector may, for example, be arranged to expose one or more resistors to the incoming radiation, and then infer the temperature of the objects in the scene from a temperature change imparted to the resistor by its exposure to the infrared (IR) radiation. Such devices may be arranged in an array such that multiple pixels image the scene.

In some imaging applications, the user may be seeking to measure temperature or temperature changes with significant accuracy. It is therefore advantageous, in such applications, to be able to assess the temperature, or at least changes in temperature, of the infrared detector array being used to image a scene.

Figure 1:
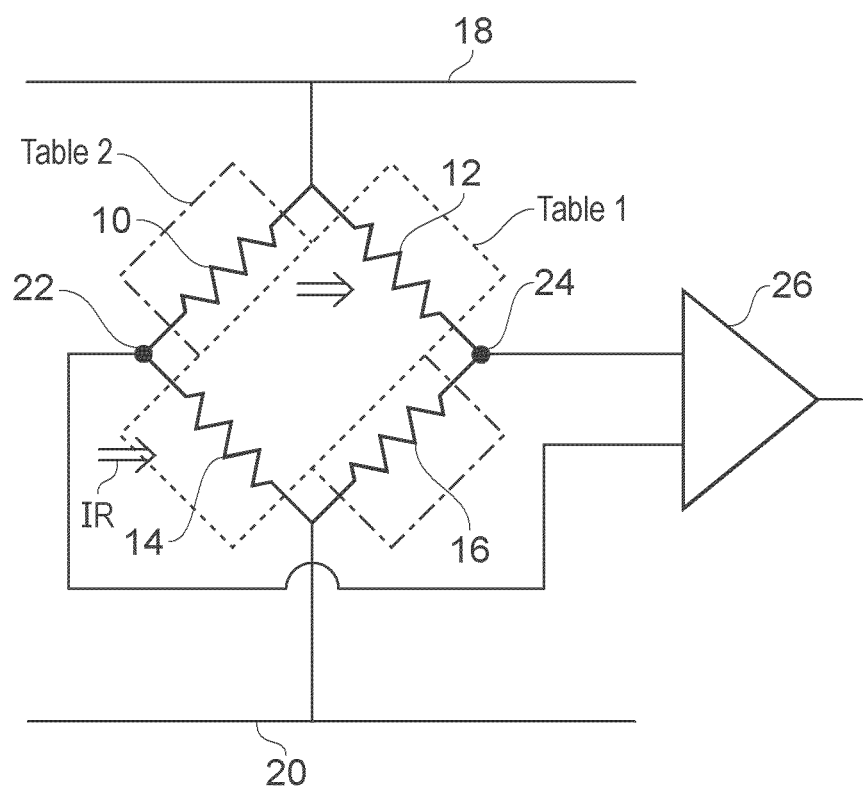
FIG. 1 is a circuit diagram of a temperature sensor which is a first embodiment of the present invention.
Figure 2:
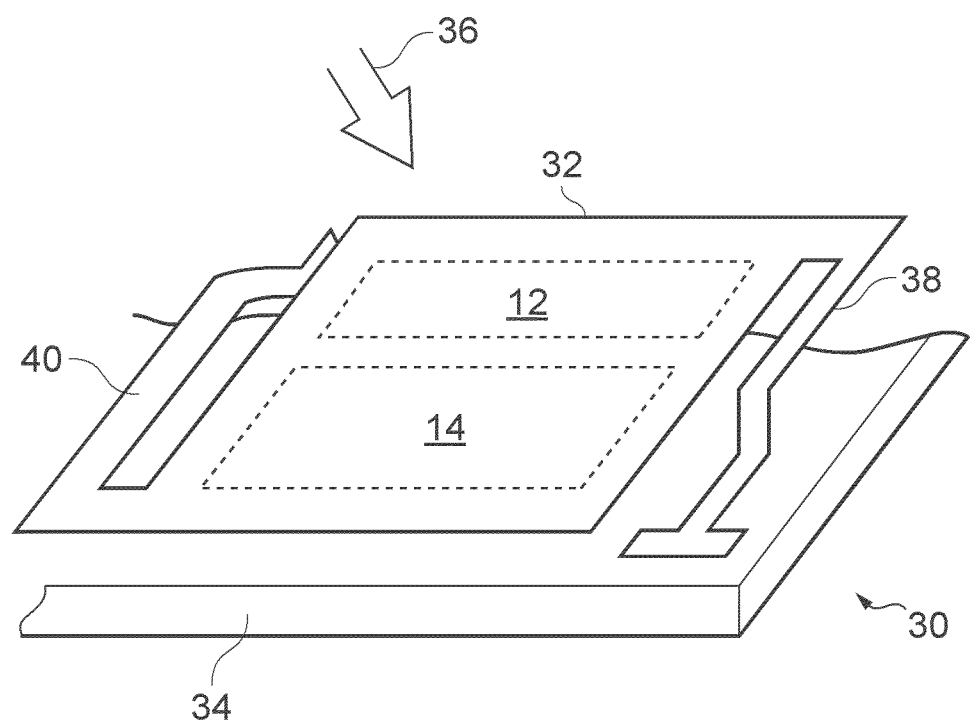
FIG. 2 is a perspective diagram of a platform for carrying temperature sensitive resistors.

Such resistor based IR sensors, also known as bolometers, are often formed by four resistors in a Wheatstone bridge arrangement, as shown in FIG. 1, with the four resistors being provided on two thermally insulated platforms or tables, one of which is shown in FIG. 2.

By way of background, the operation of a bolometer will now be discussed.

Returning to FIG. 1, first to fourth resistors 10, 12, 14 and 16, which for the purposes of use in equations have respective resistances R1 to R4, are arranged in a Wheatstone bridge configuration between first and second supply rails 18 and 20. The first resistor 10 is coupled between the supply rail 18 and a first node 22. The second resistor 12 is coupled between the first supply rail 18 and a second node 24. The third resistor 14 is coupled between the first node 22 and the second supply rail 20, and the fourth resistor 16 is connected between the second node 24 and the second supply rail 20.

Within this description the first resistor 10 may also be referred to as R1, the second resistor 12 as R2, and so on.

Each arm, formed by resistors 10 and 14, and 12 and 16, respectively, of the Wheatstone bridge acts as a potential divider. An operational amplifier 26 is connected to the first and second nodes 22 and 24 so as to measure the potential difference between the nodes 22 and 24.

The resistors 10, 12, 14 and 16 are generally fabricated on thermally isolated platforms so as to increase the thermal isolation between the individual resistors and a substrate of the IR detector. Typically the resistors 12 and 14 are formed on a first platform (also known as a table, table 1) which is exposed to the incoming IR, and resistors 10 and 16 are formed on a second table, table 2, which is notionally identical to the first platform or table, but which is shielded from the incoming IR associated with the scene. The exposed resistors 12 and 14 can be regarded as forming a pixel of the sensing array, and that pixel (which may be referred to as an active pixel) is associated with a reference circuit (which may be regarded as a reference pixel). The association may be unique, for example by providing a second table having resistors 10 and 16 thereon, for each one of the first tables. Alternatively the reference circuit, for example a second table, may be shared among multiple first tables in a time multiplexed manner.

FIG. 2 shows an example of resistors on a platform 32 embodying table 1 as typically fabricated within an infrared detector based on an array of bolometers (temperature dependent resistors).

The resistors of the bridge arrangement of FIG. 1 are provided on a plurality of platforms, of which a single one is shown in FIG. 2. This has the advantage that the resistors of the exposed table, table 1 may be formed at the same time as forming reference resistors on table 2, which in use are shielded from the impinging infrared radiation of the scene, and at the same time as forming other pixels as part of the imaging capability of the IR sensor, which as discussed are generally formed as active pixels and reference pixels which are respectively exposed to and shielded from the scene to be imaged.

Each pixel comprises a platform 32 formed above a substrate 34. The purpose of providing the platform 32 is to increase the thermal isolation between the resistors 12 and 14 of the infrared detector and the substrate 34 so that infrared radiation 36 impinging on the resistors 12 and 14 can warm them, without also warming the mass of the substrate 34. The platform 32 is attached to the substrate by relatively long and thin arms 38 and 40 which serve to secure the platform 32 to the substrate 34 whilst also presenting an elongate thermal path that impedes heat transfer between the platform 32 and the substrate 34.

Typically the platform 32 is formed by silicon micromachining techniques and can be thin, giving it a low thermal mass. Thus the platform 32 can change temperature quite quickly, giving rise to response times that are acceptable for real time thermal imaging. As noted before, the reference circuit may be formed on a further platform (table 2) which is substantially identical to the platform 32 of a pixel.

The integrated circuit may be housed within an evacuated package (as is known to the person skilled in the art) such that heat transfer by convection is minimized.

For illustrative purposes the resistors 12 and 14 of the temperature sensor have been drawn as being side by side, but in reality are formed by thin tracks that meander across the surface of the platform 32 such that each resistor 12 and 14 has a presence in other portions of the surface of the platform 32. The resistors may be effectively coincident with each other.

Conductive tracks to and from the resistors 12 and 14 may be formed on the elongate arms 38 and 40 such that a current can be supplied to the resistors 12 and 14 in order to make a measurement of resistance, and hence infer the temperature of the pixel. Table 2 is often substantially identical to table 1. We shall assume that the resistors 10, 12, 14 and 16 are made of the same material as each other, for example of titanium or silicon-chromium. However, later we shall consider the case where one or more of the resistors are made from another material, such that the resistors have different temperature coefficients of resistance.

It is advantageous to measure the temperature of the substrate supporting the array of detectors because, for example, where the detectors are implemented as temperature dependent resistors, the signal is sensitive to this temperature.

The resistance of any $i^{th}$ resistor in the Wheatstone bridge of FIG. 1 can be represented by $$Ri = R_0 i + Ki(Ti - T_0) \quad \text{(equation 1)}$$

Where
Ti is the $i^{th}$ resistor (bolometer) temperature,
$R_0 i$ is the resistance of the $i^{th}$ resistor at temperature $T_0$, and $$Ki = \frac{dRi}{dTi}$$

The temperature coefficient of resistance, TCR, $\alpha_i$ can be represented by $$\alpha i = \frac{1}{Ri} \frac{dRi}{dTi} \quad \text{(equation 2)}$$

The TCR is therefore temperature dependent $$\alpha i(Ti) = \frac{1}{\left(Ti - T0 + \frac{1}{\alpha 0i}\right)} \quad \text{(equation 3)}$$

where $\alpha_{0i}$ is the TCR of the $i^{th}$ resistor at $T_0$, and $\alpha_i(Ti)$ is the TCR of resistor $i^{th}$ resistor at temperature T of the $i^{th}$ resistor.

From equations 1 and 3 it can be shown that the derivative of the TCR can be represented as $$\frac{d\alpha i}{dTi} = -(\alpha i)^2 (Ti) \quad \text{(equation 4)}$$

Finally, we note that the resistance can be written in terms of TCR.

$$R_i = R_{0i}(1+\alpha_{0i}(T_i-T_0)) \quad \text{(equation 5)}$$

Where the subscript "0" represents a measurement or parameter as specified at $T_0$.

At thermal equilibrium, the temperatures of the resistors will equal that of the table supporting them, so, $$T_2 = T_3 = T_{Table1} \quad \text{(equation 6)}$$

for Table 1 open to the scene, where T2 is the temperature of the second resistor 12 or R2 and T3 is the temperature of the third resistor 14 or R3. Similarly T1 is the temperature of R1 and T4 is the temperature of the forth resistor 16 or R4, and $$T_1 = T_4 = T_{Table2} \quad \text{(equation 7)}$$

for the reference Table 2 obscured from the scene, i.e. shielded from the impinging Infrared radiation. The table temperatures are governed by the power dissipated on each table and their respective thermal conductances $G_1$ and $G_2$ to the substrate.

Figure 3:
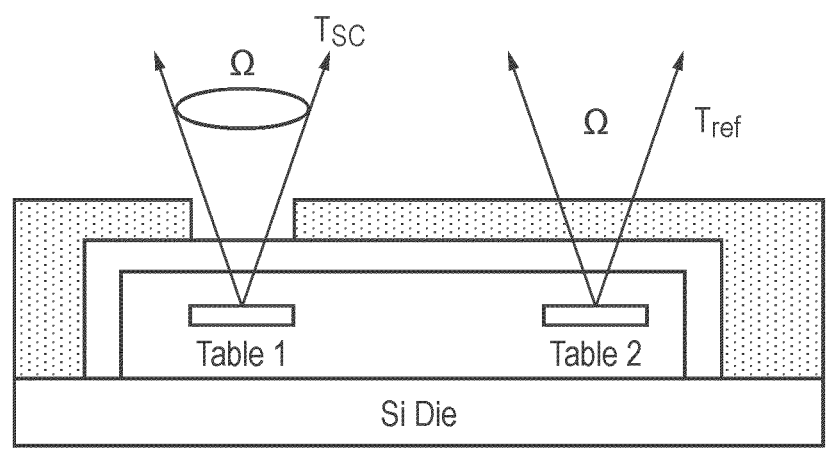
FIG. 3 is a schematic diagram of an infrared detector including a temperature sensor.

FIG. 3 schematically shows an optical arrangement for the platforms/tables, table 1 and table 2, within an integrated circuit used to form a bolometer.

We may assume that the first table, Table 1, views a uniform scene of temperature $T_{sc}$ through a solid angle 12 which depends on a lens f-number. Table 2 views an effective scene of temperature $T_{ref}$ (through approximately the same solid angle) which can be plausibly significantly higher than the ambient (or die) temperature, $T_a$. Table 2, for example may be detecting an image of itself which, because of Joule heating of the resistors as a result of current flow in them, may be operating at a temperature approximately 40° C. hotter than the substrate. Finally, we may assume that the IR energy exchange in the remaining solid angle $(4\pi-\Omega)$ is identical for both tables.

We estimate the table temperatures, $T_{Table1}$ and $T_{Table2}$ as follows:

$$T_{Table1} = T_a + \frac{P_{J1}+P_{IR1}}{G_1} \quad \text{(equation 8)}$$

$$T_{Table2} = T_a + \frac{P_{J2}+P_{IR2}}{G_2} \quad \text{(equation 9)}$$

Where $P_J$ represents the Joule heating power dissipated on the tables and $P_{IR}$ the infrared power absorbed by the tables. If the first to fourth resistors have resistances $R_1$ to $R_4$ respectively, and the voltage difference between the power rails is $V_B$, then the joule heating power is:

$$P_{J1} = V_B^2 \left( \frac{R_3}{(R_1+R_3)^2} + \frac{R_2}{(R_2+R_4)^2} \right) \quad \text{(equation 10)}$$

$$P_{J2} = V_B^2 \left( \frac{R_1}{(R_1+R_3)^2} + \frac{R_4}{(R_2+R_4)^2} \right) \quad \text{(equation 11)}$$

The optical power $P_{IR1}$ absorbed by Table 1 with area $A_{Table\ 1}$ is represented by:

$$P_{IR1}(T_{sc}) = A_{Table1} \frac{\sigma T_{sc}^4 \eta(T_{sc}) T_{cap} \alpha_{IR}(T_{sc})}{4f_\#^2+1}. \quad \text{(equation 12)}$$

Here the input optical power is assumed to be band limited by a filter (normally 7 μm to 14 μm but here 1 μm to 20 μm). The ratio η is the fraction of blackbody radiation emitted into this band and $\alpha_{IR}$ is the absorption of the table over the band, both functions of scene temperature. The transmittance through a cover over the table, for example a Si cap is $T_{cap}$ (~0.5) and the lens f-number is f# (taken as unity).

The optical power received by Table 2 may be, $P_{IR2}(T_{ref})$ $=P_{IR1}(T_{sc}=T_{ref})$ given tables of equal area. $T_{sc}$ is expressed in Kelvin and σ is Stefan's constant.

Using the above analysis one can solve the coupled equations for resistance and temperature and solve for separate bridge resistor resistances. The final signal, $V_s$, is can be represented by:

$$V_s = V_B \left( \frac{R_3}{(R_1+R_2)} - \frac{R_4}{(R_2+R_4)} \right) \quad \text{(equation 13)}$$

Responsivity

We may now consider the responsivity of a temperature sensor having tables that, as described hereinbefore, have been released from contact with the substrate. Responsivity, $R_{sp}$, is defined here as the change in bridge signal per unit change in power (optical or electrical) dissipated in Table 1, $$R_{sp} = \frac{dV_s}{dP_{Table1}}. \quad \text{(equation 14)}$$

For a well matched bridge with TCR given by α and table thermal conductances of G, this is, $$R_{sp} = \frac{V_b}{2} \frac{\alpha(T_a)}{G}, \quad \text{(equation 15)}$$

which is ambient temperature sensitive. It should be noted that the responsivity depends on the TCR at the ambient temperature, and, perhaps surprisingly, not on the platform temperature.

Scene Sensitivity

The sensitivity of the bridge signal to changes in scene temperature can be represented as $$\frac{\partial V_s}{\partial T_{sc}} = R_{sp} \frac{dP_{IR1}}{dT_{sc}} = \frac{V_B}{2} \frac{\alpha(T_a)}{G} \frac{4P_{IR1}(T_{sc})}{T_{sc}}. \quad \text{(equation 16)}$$

This (equation 16) shows that the sensitivity to the scene depends on the ambient temperature through its influence on the TCR. This sensitivity is present even in a perfectly matched bridge.

Effects of Bridge Mismatches

Up to now we have described the operation of the bolometer and Wheatstone bridge arrangement that is used for IR detection. For this purpose, ideally, the bridge should be perfectly matched in resistance, TCR and thermal conductivity.

We will now consider the effects of mismatch in these quantities and will show that mismatches give rise to sensitivity to ambient (i.e. substrate) temperature and deliberately exacerbating a mismatch (such as a thermal conductance mismatch) enables the formation of a good substrate temperature sensor formed in the same technology used for the IR sensor itself. Thus a substrate temperature sensor can effectively be provided at no additional cost within an IR sensor.

Mismatch in TCR:

During manufacture of bolometers, as is known to the person skilled in the art, the tables table 1 and table 2 are initially formed attached to the substrate 34 and subsequently released (e.g., by etching away sacrificial material) to stand over the substrate 34. If we consider the signal from the Wheatstone bridge before the bolometer tables are released from the substrate there is substantially no sensitivity to IR and all the resistors are at essentially the same temperature, close to that of the ambient $T_a$.

If the bridge is mismatched in resistance, that is, $R_{0i} \neq R_{0j}$, but the TCR is perfectly matched, it can be shown that the bridge will yield an off-set signal but it will be constant with ambient temperature, $$\frac{dV_s}{dT_a} = 0.$$

In contrast, a mismatch in TCR induces sensitivity to ambient temperature given by, $$\frac{dV_s}{dT_a} = \frac{V_b}{2}(\langle\alpha_{2,3}(T_{a1})\rangle - \langle\alpha_{1,4}(T_{a2})\rangle) \quad \text{(equation 17)}$$

$$= \frac{V_B}{2}(\alpha_{Table1} - \alpha_{Table2}).$$

Figure 4:
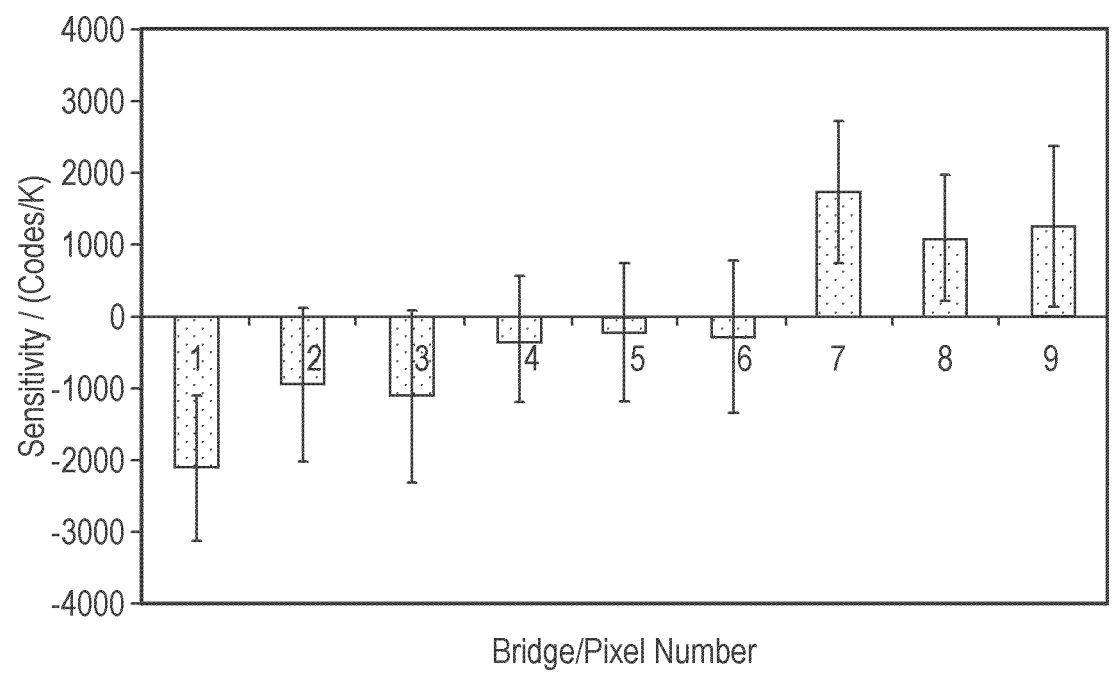
FIG. 4 is a diagram showing pixel sensitivity for a plurality of specific pixels formed in an array.

That is, the sensitivity is proportional to the difference in average TCR on each table, table 1 and table 2. Data from a plurality of substrate temperature sensors formed by pairs of tables where each of the tables is un-released (i.e. solid material between the table and the substrate) is shown in FIG. 4 for temperature sensors distributed in an array on a substrate that experienced a thermal gradient across it. In this example a sensitivity of 2000 Codes/K corresponds to a 0.4% mismatch in TCR (~0.002K$^{-1}$).

The mismatch in TCR in this example was a result of a combination of unavoidable process non-uniformities and the presence of a temperature gradient across the sample. The TCR could be deliberately engineered by forming the resistors on one of the tables of a first material, such Titanium, Aluminium or another suitable metal, and the resistors on the other table of the pair of tables from polysilicon, silicon-chromium, or the like.

Mismatch in Thermal Conductance

We can show that a small mismatch, AG, between table thermal conductance from the tables to the substrate leads to a sensitivity to ambient of, $$\frac{\partial V_s}{\partial T_a} \approx \frac{V_{bias}^3}{2}\frac{\alpha_0^2}{G^2}\Delta G \quad \text{(equation 18)}$$

If the mismatch between the tables in a bridge arrangement is gross, for example, one table is thermally grounded to the substrate (i.e. not released) whilst the other table has been released (so that there is a gap between the table and the substrate) this becomes, $$\frac{\partial V_s}{\partial T_a} \approx \frac{2V_{bias}^3 \alpha_0^2}{4GR_0 + V_{bias}^2 \alpha_0} \quad \text{(equation 19)}$$

In this situation the sensitivity to ambient temperature may be orders of magnitude greater than that of the sensitivity to scene temperature. Thus by a straightforward alteration to the IR sensor design (not suspending one of the tables while suspending a cooperating table) it is possible to produce an enhanced substrate temperature sensor.

It may be advantageous for the released table to be in a stable infrared environment, for example by shielding it from the impinging infrared radiation.

Calibration

Figure 5:
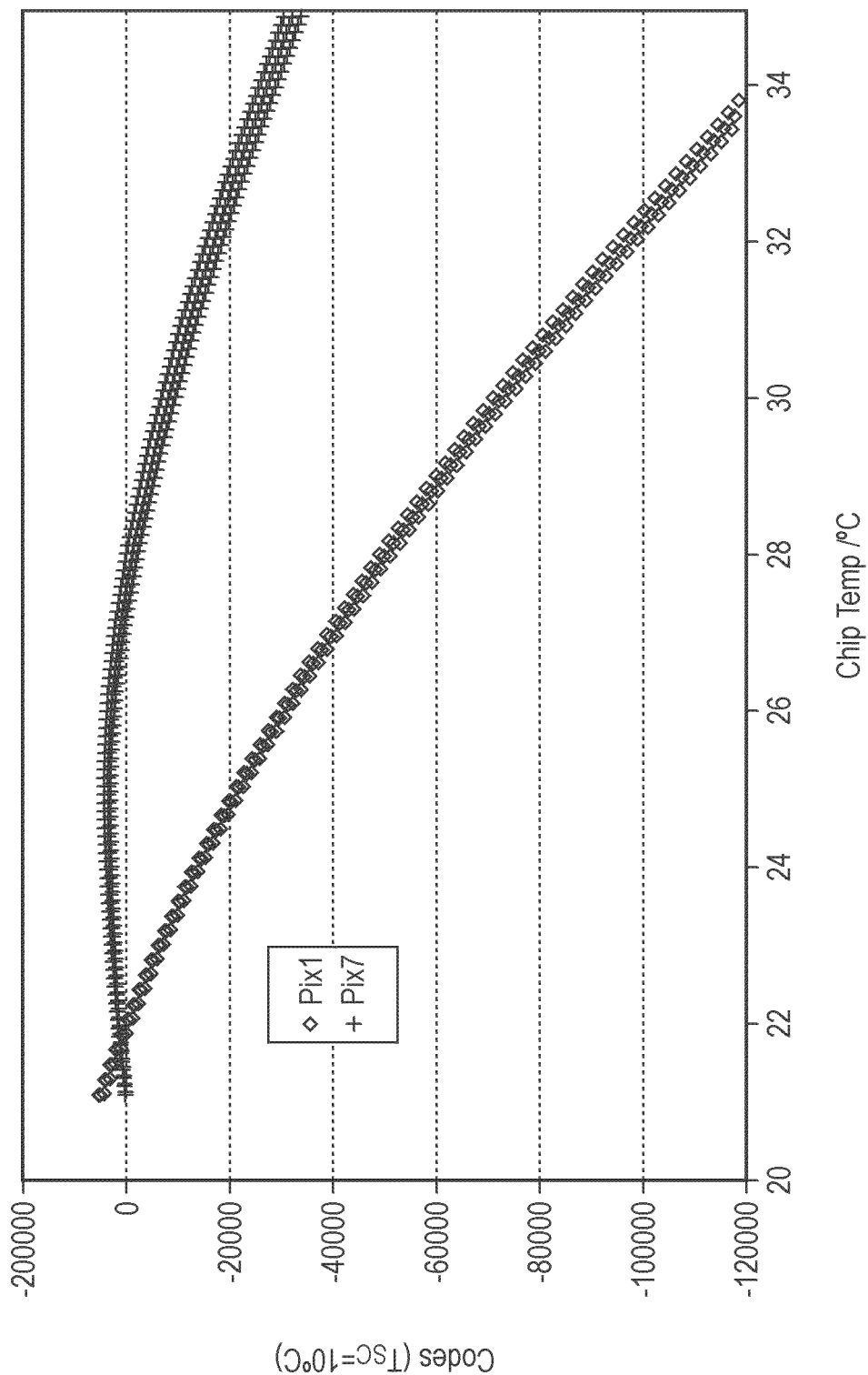
FIG. 5 is a plot of variation in output signal of a bridge with scene temperature for two distinct pixels at different ambient temperatures.
Figure 6:
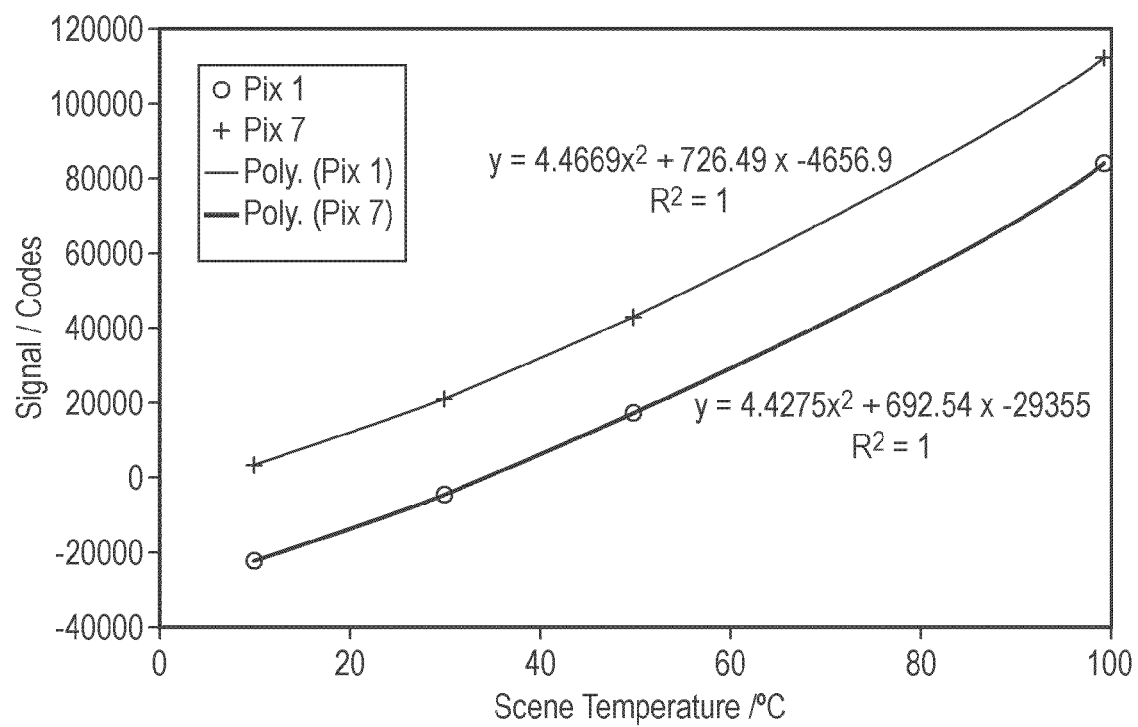
FIG. 6 shows a fit to the response characteristics of the pixels of FIG. 5 as a function of temperature.

The signal change resulting from varying the ambient temperature is shown in FIG. 5 for two pixels, pixels 1 and 7, from those shown in FIG. 4 (where a pixel is an arrangement comprising an exposed table 1 and an associated table 2) that were formed in an array. It can be seen that the variation shown in FIG. 5 is cubic in substrate temperature. The variation of signal for each of these pixels with scene temperature is shown in FIG. 6 and it can be judged that the variation is quadratic. A polynomial fit is shown in FIG. 6 for each pixel.

We have seen, for the data discussed here, that the signal codes $C=C(T_{sc}, T_a)$ varies cubically in $T_a$ but quadratically in $T_{sc}$. The calibration function $C_{cal}$ may therefore be written as, $$C_{cal}(T_{sc},T_a)=a(T_a)T_{sc}^2+b(T_a)T_{sc}+c(T_a), \quad \text{(equation 20)}$$

where the coefficients a, b and c may themselves be cubic polynomials of ambient temperature only, $$a(T_a)=a_3T_a^3+a_2T_a^2+a_1T_a+a_0$$

$$b(T_a)=b_3T_a^3+b_2T_a^2+b_1T_a+b_0$$

$$c(T_a)=c_3T_a^3+c_2T_a^2+C_1T_a+c_0 \quad \text{(equation 21)}$$

For each pixel, the 12 constants $a_i$, $b_i$, $c_i$, i=0, 1, 2, 3 are calibration constants obtained, at a minimum, from measurements at three different scene temperature for four different ambient temperatures.

A measurement of the scene temperature involves reading the chip temperature and raw output code value, $C_{meas}$. The coefficients, a, b and c are updated for the current ambient temperature and equation 20 solved for the scene temperature.

$$T_{sc} = \frac{-b + \sqrt{b^2 - 4a(c - C_{meas})}}{2a}$$

Figure 7:
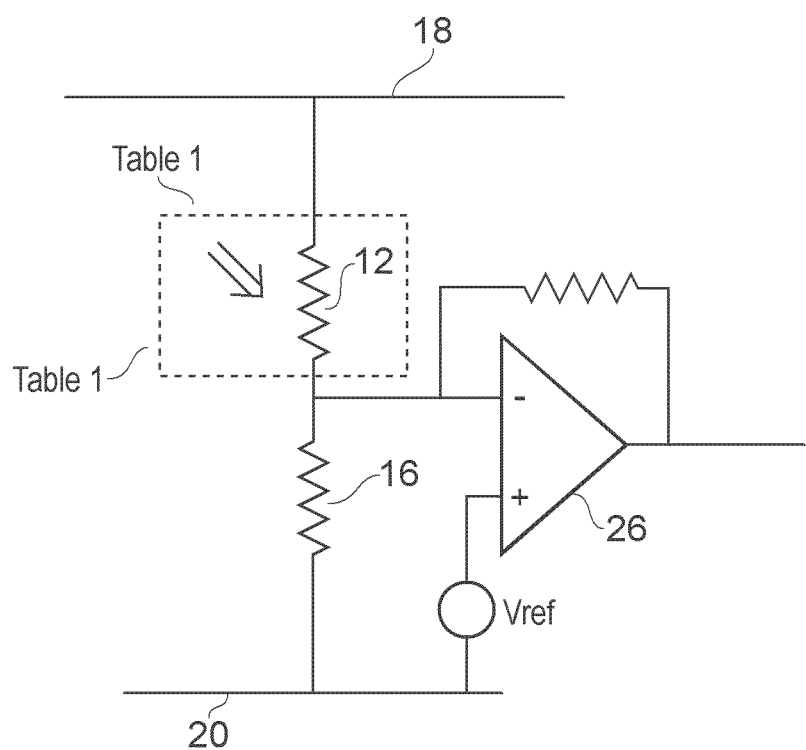
FIG. 7 is a circuit diagram for a simplified infrared detector using a potential divider, an operational amplifier and a reference voltage.

Up to now all the discussion has focussed on a Wheatstone bridge arrangement, but in fact one half, that is one arm, of the bridge can be replaced by a reference voltage. Such an arrangement is shown in FIG. 7. Similar reference numerals have been used as in FIG. 1 to identify similar components. The resistor 16 may be fabricated on the table (table 1) for good thermal matching (in which case the resistors 12 and 16 may have a different TCR as described herein) or may be formed on the substrate giving a mismatch in thermal conductance.

The responsivity can be represented by, $$\frac{dV_s}{dP} = V_b \frac{\alpha(T_a)}{4G},$$ (equation 22)

that is, half the responsivity generated in a Wheatstone bridge. This expression assumes that the temperature sensitive resistors 12 and 16 are identical. It can be seen that the resistor 16 can be omitted and be replaced by the resistor in the feedback loop of the amplifier If there is a resistance mismatch an offset signal will be generated, but, since the TCR can be represented by, $$\alpha(T_a) = \frac{1}{R}\frac{dR}{dT} = \frac{1}{\rho}\frac{d\rho}{dT},$$ (equation 23)

to first order the responsivity will remain the same and therefore independent of the resistance mismatch.

It has thus been shown that a platform and resistor arrangement which is the same as those used to form IR sensors in an array of IR sensors can also be used to measure the temperature of the Infrared detector itself. Indeed many such temperature measurement sensors may be provided within an array so as to check for thermal gradients across the array and to allow compensation for such gradients.

As noted before, the resistors need to pass a current in order to measure the temperature of the resistors. This in turn gives rise to Joule heating of the resistors. If the platform 32 is attached to the substrate 34, or alternatively the resistors are formed directly on the substrate 34, then it can be assumed that the resistors are held substantially at the temperature of the substrate 34. If the platform 32 is released from the substrate, then the Joule heating of the resistors will warm the platform and the platform temperature should be allowed to rise to its steady state or equilibrium temperature. Whilst this technique seems initially less desirable, it can have the advantage that it matches the operating characteristics of the pixels, that is those tables (table 1) in the active array of the imaging device with the corresponding reference tables (table 2) in the reference array so it still gives a "like for like" comparison of the un-illuminated reference pixel temperature.

Once the ambient temperature is known, either for the array as a whole or an area by area or pixel by pixel basis, corrections in terms of offset and gain corrections can be applied to an output of each pixel.

Figure 8:
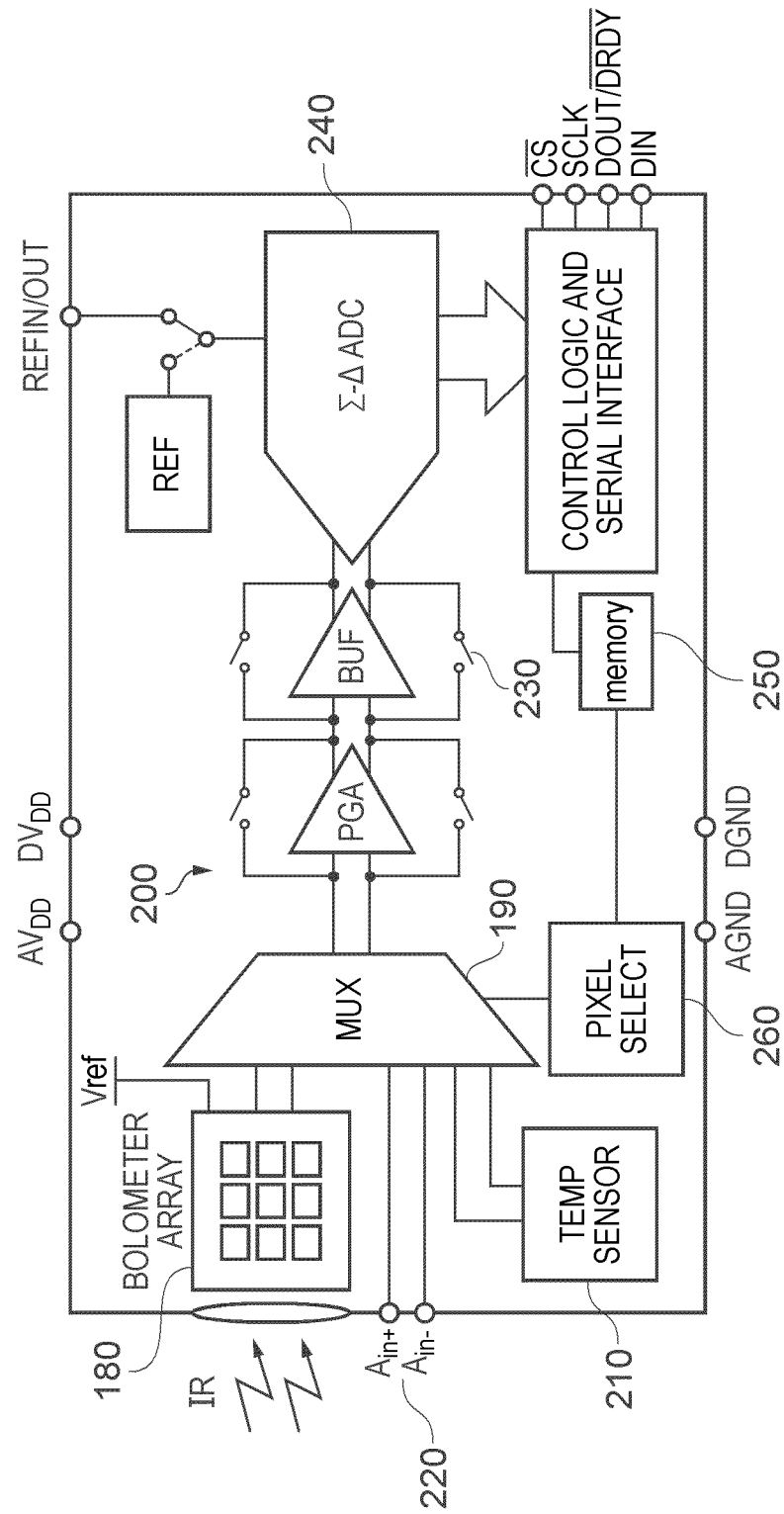
FIG. 8 is a schematic diagram of an infrared detector array including a temperature sensor in accordance with an embodiment of the present invention.

The values of gain and offset correction can be stored in a look up table, potentially addressed by temperature as well as pixel position, so as to modify the value output by the imaging array when it is read. An infra red detector having such a function is shown in FIG. 8. A plurality of pixels are provided in an array 180. These pixels are formed by temperature dependent resistors on respective platforms, and are exposed to infra red radiation from a scene to be imaged via imaging optics. An individual one of the pixels can be selected by a multiplexer 190 for connection to a first input of a programmable gain differential amplifier 200. Similarly a reference from an internal temperature sensor 210 (such as another half of a Wheatstone bridge) or an external reference 220 can be selected by the multiplexer 190 for provision to a second input of the amplifier 200. The output of the amplifier may then be buffered by a buffer 230, and the output digitized by an analog to digital converter (ADC) 240. The ADC may be a sigma-delta converter as shown in FIG. 8, or could be a different ADC technology, such as a switched-capacitor ADC.

The internal temperature sensor 210 may include reference pixels that notionally mirror the active pixels of the array 180 but which are shielded from the impinging infra red radiation. It may also include pixels on unreleased bridges, such that for example, a Wheatstone bridge circuit is formed. The output of the internal temperature sensor may be measured, for example, by ADC 240, and this result used to access a memory that stores a temperature per ADC output code, or other parameters, allowing the temperature to be calculated from the ADC output. The ADC may receive its input from a circuit such as that shown in FIG. 1 or FIG. 7. Thus the ADC and memory function as a measurement circuit that is responsive to the charge in resistance of the temperature dependent resistors, and which can estimate the temperature of the pixels. The evolution of die temperature can be monitored by the control logic, and on this basis pixel corrections can be made on the basis of the measured temperature. The temperature sensor 210 may include plurality of sensors placed around the bolometer array 180 to provide an estimate of temperature gradients across the bolometer array, and there by facilitate pixel by pixel, or region by region based correction.

Pixel by pixel correction values can be stored, in a pixel correction memory 250 responsive to a pixel selector 260, such that for a selected pixel the output from the ADC 240 can be modified by data stored in the pixel correction memory 250, such that offset, and optionally gain correction, can be performed.

The differential amplifier 200 can perform gain and offset (resistance) compensation prior to signal processing, for example by analog to digital conversion, possibly in combination with a signal integrator in order to reduce the noise bandwidth at the input of the analog to digital converter and also possibly to provide additional gain.

In experiments, the inventors have managed to induce bridge mismatches, for example in thermal conductivity, in selected bridges of a bolometer array in the order of a few % which have produced sensitivities to ambient temperature of around 20 micro-volts per Kelvin. Mismatches in thermal conductivity can be achieved through not releasing bridges, or varying the number of supports between the bridge and the substrate.

In experiments, bridge output characteristics such as that shown in FIG. 6 have been achieved, illustrating the viability of this technique to make a substrate temperature measurement without having to fabricate a different sensing technology to that already provided as part of the bolometer array.

When the temperature sensors are formed by integrated circuit manufacturing techniques, the temperature sensors can be quite accurately matched to one another. This enables several temperature sensors to be formed in or adjacent to an array of infrared detectors such that thermal gradients across the array can be measured and this information can be used to compensate the output from the array. This may be done on a column by column, row by row, region by region, or pixel by pixel basis.

It is thus possible to provide an infrared detector with improved temperature correction.

In the embodiments described above, infrared sensors were described in conjunction with particular embodiments. It will be understood, however, that the principles and advantages of the embodiments can be used for any other systems, apparatus, or methods with a need for infrared sensors and/or capturing images.

Such methods, systems, and/or apparatus can be implemented into various electronic devices. Examples of the electronic devices can include, but are not limited to, consumer electronic products, parts of the consumer electronic products, electronic test equipment, etc. Further, the electronic device can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

The teachings of the inventions provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

The claims have been drafted in single dependency format suitable for filing in the United States of America. However, for other jurisdictions where multiple dependency claims are normal, it is to be assumed that each dependent claim may depend on any preceding dependent claim of the same type, unless such a combination is clearly not feasible.

The invention claimed is:

1. A temperature sensor for use in an infrared detector, the temperature sensor comprising:
   a first resistor associated with a first thermal path having a first thermal conductivity between the first resistor and a substrate and a first temperature coefficient of resistance;
   a second resistor associated with a second thermal path having a second thermal conductivity between the second resistor and the substrate and a second temperature coefficient of resistance; and
   a measurement circuit responsive to changes in the resistance of the first and second resistors to estimate changes in temperature, and wherein at least one of the first and second thermal conductivities are different from each other or the first and second temperature coefficients of resistance are different from each other, wherein the first resistor is on a first platform on the substrate and the second resistor is on a second platform on the substrate.

2. A temperature sensor as claimed in claim 1, in which the first and second resistors are formed within an integrated circuit.

3. A temperature sensor as claimed in claim 2, in which the integrated circuit comprises a die temperature sensor including the first and second resistors.

4. A temperature sensor as claimed in claim 1, further comprising a third resistor and a fourth resistor arranged in a bridge configuration with the first and second resistors.

5. A temperature sensor as claimed in claim 4, in which the first and fourth resistors are formed on the first platform and the second and third resistors are formed on the second platform, and the first and third resistors are in series in a first limb of the bridge configuration and the second and fourth resistors are in series in a second limb of the bridge configuration.

6. A temperature sensor as claimed in claim 4, in which the first to fourth resistors have substantially identical thermal coefficients of resistance, and the first and second thermal conductivities are different from each other.

7. A temperature sensor as claimed in claim 1, in which the first platform is spaced apart from the substrate.

8. A temperature sensor as claimed in claim 1, further comprising third and fourth resistors one of which is formed on the second platform, and said third and fourth resistors are arranged in a bridge configuration with the first and second resistors.

9. A temperature sensor as claimed in claim 8, in which the second platform is spaced apart from the substrate.

10. A temperature sensor as claimed in claim 1, in which the first and second platforms have different thermal conductances to the substrate.

11. A temperature sensor as claimed in claim 10, in which one of the first and second platforms is held against, or not released from, the substrate.

12. An infrared detector comprising at least one temperature sensor as claimed in claim 1.

13. An infrared detector as claimed in claim 12, comprising a plurality of temperature sensors arranged at spaced apart positions with respect to an array of infrared detectors, so as to estimate a temperature profile across the detector array.

14. An infrared detector as claimed in claim 13, in which the array of infrared detectors comprises an array of temperature dependent resistors.

15. An infrared detector as claimed in claim 12, further including a correction memory arranged to store at least one of offset or gain corrections as a function of temperature.

16. A temperature sensor for use in an infrared detector, the temperature sensor comprising:
   a first resistor associated with a first thermal path having a first thermal conductivity between the first resistor and a substrate and a first temperature coefficient of resistance;
   a second resistor associated with a second thermal path having a second thermal conductivity between the second resistor and the substrate and a second temperature coefficient of resistance; and a measurement circuit responsive to changes in the resistance of the first and second resistors to estimate changes in temperature, and wherein the first and second resistors have substantially the same thermal conductivity to the substrate and the first and second resistors have different temperature coefficients of resistivity, and wherein the first resistor is on a platform spaced apart from the substrate.

17. A method of measuring a temperature of a substrate, comprising:

providing first and second resistors having different thermal conductivities between the resistors and the substrate, wherein the first resistor and the second resistors are formed on different platforms on the substrate, passing a current through the resistors such that they are heated by the current, and using a difference in the resistances of the resistors to estimate the temperature of the substrate.

18. A method as claimed in claim 17, where the relationship between resistance and temperature has been stored in a table, and the table is looked up to estimate the substrate temperature.

19. A method of measuring a temperature of a substrate, comprising providing first and second resistors having different temperature coefficients of resistivity and in thermal contact with the substrate via paths having the same or different thermal conductivities, wherein the first resistor is formed on a first platform on the substrate and the second resistor is formed on a second platform on the substrate, and wherein the method further comprises passing a current through the first and second resistors such that the resistances can be measured, and estimating the temperature of the substrate based on the relationship between the resistances of the first and second resistors.

20. A temperature sensor as claimed in claim 16 further comprising a third resistor and a fourth resistor, wherein the first resistor and the second resistor are on different platforms on the substrate, and wherein the first resistor, the second resistor, the third resistor, and the fourth resistor are arranged in a bridge configuration, wherein a temperature is determined based at least in part on the thermal mismatch between at least two of the first to fourth resistors.

* * * * *